US012780156B2

(12) United States Patent
Kerber-Wunderlich et al.

(10) Patent No.: US 12,780,156 B2
(45) Date of Patent: Nov. 3, 2026

(54) YAW RATE REGULATION ACTIVATION

(71) Applicant: Continental Automotive Technologies GmbH, Hannover (DE)

(72) Inventors: Henning Kerber-Wunderlich, Darmstadt (DE); Lennart Schmidt, Karben (DE)

(73) Assignee: Continental Automotive Technologies GmbH, Hannover (DE)

( * ) Notice: Subject to any disclaimer, the term of this patent is extended or adjusted under 35 U.S.C. 154(b) by 201 days.

(21) Appl. No.: 18/250,304

(22) PCT Filed: Oct. 6, 2021

(86) PCT No.: PCT/DE2021/200146
§ 371 (c)(1),
(2) Date: Apr. 24, 2023

(87) PCT Pub. No.: WO2022/083831
PCT Pub. Date: Apr. 28, 2022

(65) Prior Publication Data

US 2023/0398966 A1 Dec. 14, 2023

(30) Foreign Application Priority Data

Oct. 23, 2020 (DE) ..................... 10 2020 213 413.8

(51) Int. Cl.
*B60T 8/171* (2006.01)
*B60T 8/1755* (2006.01)
*B60T 8/176* (2006.01)

(52) U.S. Cl.
CPC .......... *B60T 8/171* (2013.01); *B60T 8/17555* (2013.01); *B60T 8/176* (2013.01); *B60T 2250/03* (2013.01)

(58) Field of Classification Search
CPC ...... B60T 8/171; B60T 8/17555; B60T 8/176; B60T 2250/03; B60Y 2400/81
See application file for complete search history.

(56) References Cited

U.S. PATENT DOCUMENTS 6,202,009 B1 * 3/2001 Tseng ...................... B60T 8/171 180/199
6,325,469 B1 12/2001 Carson et al.
(Continued)

FOREIGN PATENT DOCUMENTS

CN 102481930 A 5/2012
CN 108248454 A 7/2018
(Continued)

OTHER PUBLICATIONS

German Search Report dated Mar. 30, 2021 for the counterpart German Patent Application No. 102020213413.8.
(Continued)

*Primary Examiner* — Kurt Philip Liethen
(74) *Attorney, Agent, or Firm* — Buchanan Ingersoll & Rooney PC

(57) ABSTRACT

A yaw rate control method comprises a yaw rate control function for stabilizing a vehicle carries out wheel-specific braking interventions based on a first reference yaw rate. A deactivation function is provided and activates the yaw rate control function as soon as at least one activation requirement is met. The activation requirement checks whether a longitudinal deceleration is greater than a longitudinal deceleration limit value, in particular by a sensor tolerance, a lateral acceleration is greater than a lateral acceleration limit value, in particular by a sensor tolerance, and (Continued)

a deviation between a second reference yaw rate and a measured yaw rate is greater than a yaw rate deviation limit value, in particular by a sensor tolerance.

17 Claims, 1 Drawing Sheet

(56) References Cited

U.S. PATENT DOCUMENTS

| | | | | |
|---|---|---|---|---|
| 8,849,537 | B2 | 9/2014 | Yoon | |
| 11,117,559 | B2 * | 9/2021 | Takahashi | B60T 8/321 |
| 2002/0087247 | A1 * | 7/2002 | Tanaka | B60T 8/1755 701/41 |
| 2003/0060960 | A1 * | 3/2003 | Hartmann | B62D 6/007 701/1 |
| 2004/0098184 | A1 * | 5/2004 | Ghoneim | B60T 8/17555 701/1 |
| 2006/0155454 | A1 | 7/2006 | Herrmann | |
| 2006/0273657 | A1 | 12/2006 | Wanke | |
| 2007/0021896 | A1 * | 1/2007 | O'Dea | B60T 8/172 701/1 |
| 2007/0050112 | A1 * | 3/2007 | Kroehnert | B60T 8/17555 701/91 |
| 2012/0197507 | A1 * | 8/2012 | Custer | B60K 31/0008 701/96 |
| 2013/0030601 | A1 | 1/2013 | Yoon | |
| 2013/0245889 | A1 * | 9/2013 | Kikuchi | B60T 8/17555 701/38 |
| 2015/0039175 | A1 * | 2/2015 | Martin | G06Q 40/08 701/31.5 |
| 2017/0066422 | A1 * | 3/2017 | Kerber | B60W 30/18109 |
| 2018/0312148 | A1 * | 11/2018 | Czaja | B60T 7/20 |

FOREIGN PATENT DOCUMENTS

| | | | |
|---|---|---|---|
| DE | 10154028 | A1 | 4/2003 |
| DE | 69624946 | T2 | 7/2003 |
| DE | 10244557 | A1 | 4/2004 |
| DE | 102006051908 | A1 | 10/2007 |
| DE | 102011087799 | A1 | 1/2013 |
| DE | 102014211061 | A1 | 1/2016 |
| KR | 20060120061 | A | 11/2006 |
| KR | 20190079844 | A | 7/2019 |

OTHER PUBLICATIONS

The International Search Report and the Written Opinion of the International Searching Authority mailed on Oct. 6, 2021 for the counterpart PCT Application No. PCT/DE2021/200416.

Iso Norm 26262 Part 3 concept phase, https://wisdom.conti.de/startform.wgx; International Standard; Road vehicles—functional safety.

Iso Norm 26262 Part 1 Vocabularly, https://wisdom.conti.de/startform.wgx; International Standard; Road vehicles—functional safety.

European Examination Report dated Jun. 12, 2025 for the counterpart European Patent Application No. 21 794 751.4 and machine translation of same.

Korean Office Action dated Sep. 22, 2025 for the counterpart Korean Patent Application No. 10 2023 7009113 and machine translation of same.

Chinese Office Action dated Oct. 10, 2025 for the counterpart Chinese Patent Application No. 1202180068524.2 and machine translation of same.

Office Action (The Second Office Action) issued May 30, 2026, by the State Intellectual Property Office of People's Republic of China in corresponding Chinese Patent Application No. 202180068524.2 and an English translation of the Office Action. (9 pages).

* cited by examiner

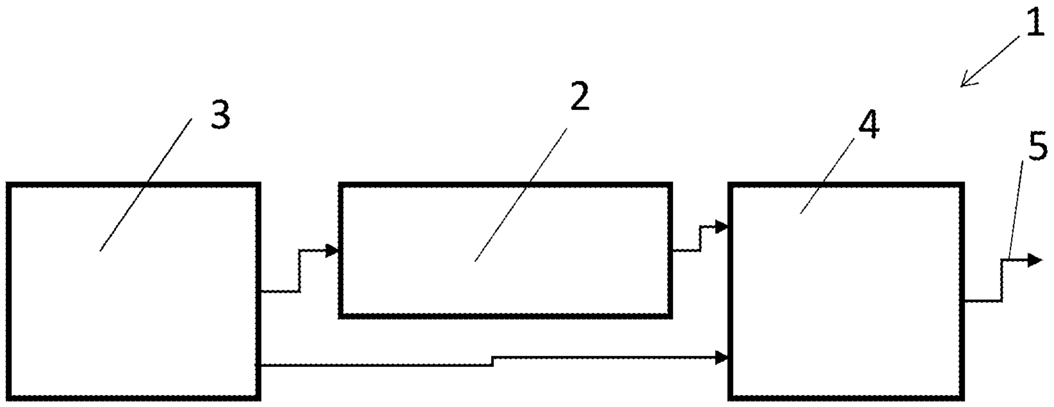
1
3
2
4
5

YAW RATE REGULATION ACTIVATION

TECHNICAL FIELD

The invention relates to a yaw rate control method in which a yaw rate control function for stabilizing a vehicle carries out wheel-specific braking interventions.

BACKGROUND

A yaw rate control function or Active Yaw Control (AYC) is also referred to as ESC or electronic stability program or is part of such a functional unit and carries out wheel-specific braking interventions in the event of yaw rate deviations from a reference yaw rate For systems that intervene in the control of the vehicle, i.e. in the drive, the steering and/or the brakes, independently of a driver's request, ISO 26262 requires that, with regard to functional safety, specific measures are taken depending on the risk assessment during development in order to limit the risk. According to the potential risk, there is a classification into classes QM or ASIL A to ASIL D, wherein the severity of the effect (severity—S), the frequency of the driving situation (exposure—E) and the controllability of the malfunction by the driver (controllability—C) are estimated.

This system results in an ASIL B for the yaw rate control in the use case due to the low probability of occurrence. On the other hand, the avoidance of destabilization due to an incorrect intervention in the non-use case is rated with ASIL D. In order to avoid having to design the entire function according to ASIL D, an architecture is chosen in which the yaw rate control function is preceded by a deactivation component (FunctionDisabling, FD), which activates the actual function only in certain "use cases", and is followed by a "safety barrier" which only switches through or only fully switches through requirements related to the actuator if the deactivation component has activated this in the use case. Otherwise, the requirement is limited to the point of no actuation at all.

Since use case detection that is too strict can lead to interventions taking place too late or too weakly, all situations except for unbraked, stable straight-ahead driving were defined as use cases for the previous implemented use case detection. This avoided an undesired curtailment of yaw rate control interventions. However, since the activation frequency is very high, the requirements according to ASIL D continue to apply to the previous yaw rate control function. Overall, the development effort for ASIL D components is significantly greater than for ASIL B components. One measure is that the function must run in a safety task in order to ensure a required "freedom from interference" from non-ASIL D to ASIL D components.

Therefore, it is desirable to specify a method which can be used to release a yaw rate control function and which meets the specifications for ASIL B.

SUMMARY

A yaw rate control method comprises a yaw rate control function for stabilizing a vehicle which carries out wheel-specific braking interventions based on a first reference yaw rate. This reference yaw rate is typically calculated from a vehicle model and current driving parameters. A separate deactivation function is provided which activates the yaw rate control function as soon as at least one activation requirement is met. The deactivation function can be separated from the yaw rate control function, for example, by switching between a safety task with its own memory and a normal task. This ensures that memory contents of the safety task cannot be changed unintentionally by functions running in the normal task.

As an activation requirement, it is at least checked whether a longitudinal deceleration is greater than a longitudinal deceleration limit value for example by a sensor tolerance, a lateral acceleration is greater than a lateral acceleration limit value for example by a sensor tolerance, and a deviation between a second reference yaw rate and a measured yaw rate is greater than a yaw rate deviation limit value, for example by a sensor tolerance. A reference yaw rate that differs from the first reference yaw rate can be used as the second reference yaw rate. The second reference yaw rate can be calculated, for example, from a vehicle model that differs from the first reference yaw rate. For example, a simple stationary Ackermann model, for which an ASIL D can be achieved with little effort, can be used for the deactivation function. A more complex model, for which only an ASIL B can be achieved due to its complexity and additional input signals, can then be used for the yaw rate control function.

In an embodiment, the second reference yaw rate is calculated from a measured steering angle and/or a measured lateral acceleration of the vehicle. A formula from the single-track model can be used to calculate the reference yaw rate from the steering angle:

$$\dot{\Psi} = \delta \cdot \frac{v}{l + EG \cdot v^2}$$

with the yaw rate $\dot{\Psi}$, the vehicle speed v, the steering angle δ, the wheelbase l and the self-steering gradient. The self-steering gradient results from the different slip stiffnesses of the front and rear axles as well as from the position of the center of gravity and the vehicle mass. It indicates how much more the steering wheel has to be turned with increasing speed (and also lateral acceleration) in order to maintain the same curve radius and to compensate for the different slip angles of the front and rear axles.

If the actual yaw rate deviates from the reference yaw rate calculated from the steering angle by more than a permissible amount, the yaw rate deviation limit value, then an unstable driving situation, synonymous with a "use case", can be inferred. The deactivation function activates the yaw rate control function accordingly.

It can happen that the driver uses the steering angle to specify a yaw rate that cannot be achieved in a stable manner at the existing road friction coefficient. In this case, although the actual yaw rate corresponds to the steering angle target specification, the vehicle turns slowly and builds up a side slip angle. In order to be able to recognize such a case as a "use case", it makes sense to either limit the reference yaw rate using friction coefficient information and/or to calculate a second reference yaw rate based on the current lateral acceleration. Here, too, it is possible to conclude that the driving situation is unstable from the deviation between the actual yaw rate and the reference yaw rate calculated from the lateral acceleration. The relationship between the yaw rate and the lateral acceleration during steady-state circular travel is given by:

$$\dot{\Psi} = \frac{a_y}{v}$$

with the lateral acceleration $a_y$.

As soon as at least one of the yaw rate comparisons shows a significant deviation, an unstable driving situation and thus a "use case" can be inferred.

Activation solely based on a detected unstable driving situation would require that an actual yaw rate deviation would first have to be present before the unlimited yaw rate intervention is activated. The method enables early activation of a pilot control intervention, which prevents instability from the outset. The evaluation of frequency distributions of driving profiles shows that certain situations, such as driving with very high lateral acceleration or heavy braking or deceleration, occur only extremely rarely. For such rare situations, a classification into an exposure of E2 or E1 is carried out during the risk assessment with regard to the frequency. Thus, the normal ASIL level B of the actual yaw rate control function is sufficient and there is no longer any need for additional reliable detection of an unstable driving state. It is sufficient to accordingly reliably detect this rare driving situation. Reliable detection is guaranteed if the sensor value minus the sensor tolerance exceeds the corresponding threshold.

Activating the yaw rate control function, both by detecting instabilities and by detecting certain rare driving situations, means that in many cases the activation in the use case takes place without any delay, especially at a high friction coefficient: Use cases for the yaw rate control function generally only arise when the traction potential of the road has already been largely exhausted. At a high friction coefficient, this use of traction is associated with high lateral acceleration and/or vehicle deceleration, i.e. a situation that is evaluated with the frequency E2 or E1 and for which the yaw rate control function is generally activated via the conditions mentioned. Since in these situations there is no need to wait for a yaw rate deviation, the yaw rate control intervention can take place early and with full force.

At a low friction coefficient, an actual instability can be detected via the yaw rate deviation in order to be able to distinguish the unstable journey at a low friction coefficient from stable journey at a high friction coefficient with a comparable level of lateral acceleration. With the above-mentioned mechanisms, the yaw rate control function is activated for less than 1% of the time during normal journeys at a high friction coefficient and thus has a frequency of only E2. Since the situation detection is fully implemented in ASIL D, there is no decomposition into B(D) use case detection and a B(D) controller. The safety goal of avoiding error-induced destabilization of the vehicle was defined with the values [S3;E4;C3] for severity class, exposure class and controllability class. Limiting the activation of the yaw rate control function to driving situations with a probability of occurrence of less than 1% now reduces the exposure from E4 to E2. According to ISO 26262-3:201.8 (E) Table 4, the ASIL is thus reduced to B. The controller does not have to run in a safety task and, for the controller part, only the B metrics have to be fulfilled at the software level. In addition, the deactivation function (FunctionDisable) and the controller itself can be controlled based on the same signals, since there does not need to be any independence.

In an embodiment, the limit values of the activation requirements are selected in such a way that they are met for less than 1% of the operating time. A design according to ASIL B is therefore sufficient.

In an embodiment, the deactivation function blocks the yaw rate control function completely if no activation requirement is met, i.e. the yaw rate control function must not control an actuator and accordingly must not intervene in the control of the motor vehicle. Alternatively, the deactivation function only partially disables the yaw rate control function. The control interventions of the yaw rate control function can then be sent to the respective actuator in reduced form, so that only weak interventions take place, which do not endanger the safety of the vehicle in the event of incorrect interventions. It is also possible to design the blocking differently for different actuators. For example, a braking intervention can be reduced and a steering intervention can be completely blocked if no activation requirement is met.

In an embodiment, the deactivation function is upstream and/or downstream of the yaw rate control function. An upstream deactivation function sends a signal to the yaw rate control function and informs it whether it is activated or deactivated. The yaw rate control function can then accordingly carry out an intervention or not. In order to have a safe concept even in the event of errors in the yaw rate control function, in which it carries out incorrect interventions despite actual deactivation, the deactivation function can also be downstream. This means that the yaw rate control function does not have a direct communication path to the actual actuator, but communicates via a safety barrier. This safety barrier, when activated, can forward a command sent by the yaw rate control function to the actuator and, when not activated, cannot forward the command or command reduced intervention.

In an embodiment, the longitudinal deceleration limit value is greater than 2.5 $m/s^2$, preferably greater than 3 $m/s^2$. Accordingly, a situation in which a yaw rate control function may be required is only assumed in the event of greater decelerations. This effectively reduces the activation time.

In an embodiment, the longitudinal deceleration limit value is speed-dependent and falls particularly with higher vehicle speeds. For example, below 100 km/h, a longitudinal deceleration limit value of 4 $m/s^2$ can be selected and, above 100 km/h, a longitudinal deceleration limit value of 3 $m/s^2$ can be selected.

In an embodiment, the longitudinal deceleration is determined, by means of an acceleration sensor, from the derivative of the vehicle speed and/or from data from the brake system. It is possible to individually compare longitudinal deceleration values from a plurality of sources with the longitudinal deceleration limit value and/or to form an average value and use this for the comparison.

In an embodiment, the lateral acceleration limit value is greater than 2.5 $m/s^2$. For example, if the lateral acceleration limit value is set to $a_{limit,E2}$=3.5 $m/s^2$ and the sensor used has a sensor tolerance of 2 $m/s^2$, the absolute value of the lateral acceleration measured must be at least 5.5 $m/s^2$ such that the activation condition is met. Including the sensor tolerance avoids activations taking place too often due to measurement errors.

In an embodiment, the lateral acceleration is determined from measured values from an acceleration sensor and/or from a yaw rate sensor and the vehicle speed. Since different sensors have different tolerances, the yaw rate sensor can also be used instead of the lateral acceleration sensor to determine the lateral acceleration and thus to activate the yaw rate control function. For this purpose, the yaw rate and the associated tolerance of the yaw rate sensor can be converted into a lateral acceleration.

In an embodiment, the presence of an ABS intervention is checked as an additional activation requirement. As soon as one of the above activation requirements or an ABS intervention is present, the yaw rate control function is activated.

Since ABS interventions are rated E2 due to the low probability of occurrence, the ASIL B of the normal yaw rate control function during ABS interventions is sufficient.

In an embodiment, as an additional activation requirement, it is checked whether a side slip angle signal is greater in terms of absolute value than a side slip angle limit value, in particular by a sensor tolerance. This can be used in particular if there is an ASIL D side slip angle signal. The side slip angle signal can be measured optically using an additional Correvit sensor, for example. It is also possible to determine the side slip angle using a camera that is already required for autonomous driving, or to estimate it by way of a model using the normal ESP sensors. A "use case" can be inferred if the side slip angle signal exceeds a specified threshold value. As soon as one of the above activation requirements is met or a corresponding side slip angle is present, the yaw rate control function is activated.

The threshold value can either be specified as a fixed value or calculated depending on the situation using a reference model. In addition to the reference yaw rate, the well-known Ackermann single-track model already provides a reference side slip angle that can be used for this purpose.

Alternatively, a specific rear axle slip angle can be defined as a criterion and a threshold value for the side slip angle at the vehicle's center of gravity can be determined using this criterion. Between the side slip angle ($\beta$) at the center of gravity and the rear axle slip angle ($\alpha_H$) there is a purely geometric relationship:

$$\alpha_h = \delta_h + \beta + \frac{l_h \cdot \dot{\psi}}{v}$$

$\delta_H$ refers here to the steering angle set by any existing rear axle steering.

Activation via the side slip angle signal in the area of low friction coefficients, since in this case it is more difficult to activate via the criterion of a high lateral acceleration. At a low friction coefficient, there are certain situations in which the vehicle turns slowly, wherein the model-based detection using the deviation of the actual yaw rate from the reference yaw rate calculated either from the current steering angle or from the current lateral acceleration does not respond or only responds late because the deviations are too small, as long as the driver does not countersteer.

In an embodiment, as an additional activation requirement, it is checked whether a longitudinal acceleration signal is greater than a longitudinal acceleration limit value, in particular by a sensor tolerance. A longitudinal acceleration should be understood here as meaning a positive change in speed. As with the decelerations, there are certain acceleration states (e.g. >3 $m/s^2$) which occur only very rarely and therefore allow the yaw rate control function to be activated. The vehicle acceleration can either be calculated using an acceleration sensor or using the derivative of a speed signal determined from the wheel speeds, or estimated from the effective drive torque. As soon as one of the above activation requirements or a corresponding acceleration signal is present, the yaw rate control function is activated. In this way, instabilities for example when starting off can also be detected at an early stage.

In an embodiment, as an additional activation requirement, it is checked whether a vehicle speed is greater than a vehicle speed limit value, in particular by a sensor tolerance. Since very high vehicle speeds also occur very rarely, the vehicle speed can also be used directly as an alternative activation requirement. For example, activation is fundamentally possible at speeds above 160 km/h.

In an embodiment, as an additional activation requirement, it is checked whether a steering angle is greater in terms of absolute value, in particular by a sensor tolerance, than a steering angle limit value that is for example dependent on the speed. A speed-dependent steering angle threshold can be calculated using an inverse single-track model. If it is exceeded, this indicates that, due to the current steering angle, either a driving situation with unusually high lateral acceleration, which allows the yaw rate control function to be activated due to the frequency distribution, or an unstable driving situation, which by definition represents a use case, must be present. As soon as one of the above activation requirements or a corresponding steering angle is present, the yaw rate control function is activated.

In an embodiment, the yaw rate control function is not performed in a safety task and the deactivation function is performed in a safety task.

Further features, advantages and possible applications of the invention also result from the description below of exemplary embodiments and the drawings. All of the features described and/or pictorially depicted belong to the subject matter of the invention both individually and in any combination, also independently of their summarization in the claims or the back-references thereof.

BRIEF DESCRIPTION OF THE DRAWINGS

FIG. 1 schematically shows yaw rate control.

DETAILED DESCRIPTION

The yaw rate control 1, as shown in FIG. 1, has, as a central element, the actual yaw rate control function 2 which is surrounded by the deactivation function 3, 4. An upstream part of the deactivation function 3, 4 is referred to as a function deactivator (FunctionDisable) 3 and checks the implemented activation requirements. These are for example the lateral acceleration of the motor vehicle, the longitudinal deceleration of the motor vehicle and the yaw rate of the motor vehicle. In the general case, the function deactivator 3 deactivates the yaw rate control function 2 by sending a corresponding signal to the yaw rate control function 2. The function deactivator 3 also sends the deactivation signal to a downstream safety barrier 4. The safety barrier 4 is connected between the yaw rate control function 2 and the corresponding actuator or actuators 5. The yaw rate control function 2 therefore accesses the actuators 5 via the safety barrier 4; there is no direct communication path. The safety barrier 4 may or may not forward a command to the actuators 5 based on the signal from the function deactivator 3.

This ensures that the yaw rate control function 2 intervenes in the vehicle control only in use cases.

The invention claimed is:

1. A yaw rate control method comprising;

carrying out wheel-specific braking interventions for stabilizing a vehicle with a yaw rate control function based on a first reference yaw rate;

checking whether at least one activation requirement is met by:

checking if a longitudinal deceleration is greater than a longitudinal deceleration limit value; by a sensor tolerance;

checking if a lateral acceleration is greater in terms of absolute value than a lateral acceleration limit value, by a sensor tolerance; and checking if a deviation between a second reference yaw rate and a measured yaw rate is greater than a yaw rate deviation limit value by a sensor tolerance;

activating the yaw rate control function with a deactivation function in response towhen at least one activation requirement is met; and partially blocking the yaw rate control function with the deactivation function in when no activation requirement is met.

2. The method as claimed in claim 1, further comprising calculating the second reference yaw rate using on one of a measured steering angle and a measured lateral acceleration of the vehicle.

3. The method as claimed claim 1, further comprising selecting the limit values of the activation requirements such that the activation requirements are met for less than 1% of the operating time.

4. The method as claimed in claim 1, wherein the deactivation function is one of upstream and downstream of the yaw rate control function.

5. The method as claimed claim 1, wherein the longitudinal deceleration limit value is greater than 2.5 m/s2.

6. The method as claimed in claim 1, wherein the longitudinal deceleration limit value is speed dependent speed and decreases with higher vehicle speeds.

7. The method as claimed in claim 1, further comprising determining the longitudinal deceleration with at least one of an acceleration sensor, from the derivative of the vehicle speed and from data from the brake system.

8. The method as claimed in claim 1, wherein the lateral acceleration limit value is greater than 2.5 m/s2.

9. The method as claimed in claim 1, further comprising determining the lateral acceleration from at least one of measured values from an acceleration sensor and from a yaw rate sensor and the vehicle speed.

10. The method as claimed in claim 1, wherein checking the at least one activation requirement is met further comprises checking for the presence of an ABS intervention.

11. The method as claimed in claim 1, wherein checking the at least one activation requirement is met further comprises checking if a side slip angle signal is greater in terms of absolute value than a side slip angle limit value by a sensor tolerance.

12. The method as claimed in claim 1, wherein checking the at least one activation requirement is met further comprises checking if a longitudinal acceleration signal is greater than a longitudinal acceleration limit value by a sensor tolerance.

13. The method as claimed claim 1, wherein checking the at least one activation requirement is met further comprises checking if a vehicle speed is greater than a vehicle speed limit value, in particular by a sensor tolerance.

14. The method as claimed claim 1, wherein checking the at least one activation requirement is met further comprises checking if a steering angle is greater in terms of absolute value by a sensor tolerance, than a steering angle limit value that is in particular dependent on the speed.

15. The method as claimed in claim 1, wherein the yaw rate control function is not performed in a safety task and the deactivation function is performed in a safety task.

16. The method as claim 1, wherein a control unit for yaw rate control, is configured to carry out the instructions of the yaw rate control method.

17. The method as claim 1, wherein the partial deactivation of the yaw rate control function further comprises sending only a partial control function to the actuator in reduced form of the fully activated yaw rate control function.

* * * * *